United States Patent [19]
Herman

[11] Patent Number: 4,515,007
[45] Date of Patent: May 7, 1985

[54] METHOD OF AND APPARATUS FOR TESTING THE INTEGRITY OF FILTERS

[75] Inventor: Raymond L. Herman, Richland, Wash.

[73] Assignee: The United States of America as represented by the United States Department of Energy, Washington, D.C.

[21] Appl. No.: 455,446

[22] Filed: Jan. 4, 1983

[51] Int. Cl.³ .............................................. G01M 3/20
[52] U.S. Cl. ........................................ 73/38; 73/40.7; 55/97
[58] Field of Search ...................... 73/38, 40.7; 55/97, 55/270

[56] References Cited
U.S. PATENT DOCUMENTS 4,055,075 10/1977 Allan et al. ........................... 73/40.7
4,324,568 4/1982 Wilcox et al. ....................... 73/40.7

Primary Examiner—Stephen A. Kreitman
Assistant Examiner—Hezron Williams
Attorney, Agent, or Firm—Edward W. Nypaver; Richard E. Constant

[57] ABSTRACT

A method of and apparatus for testing the integrity of individual filters or filter stages of a multistage filtering system including a diffuser permanently mounted upstream and/or downstream of the filter stage to be tested for generating pressure differentials to create sufficient turbulence for uniformly dispersing trace agent particles within the airstream upstream and downstream of such filter stage. Samples of the particle concentration are taken upstream and downstream of the filter stage for comparison to determine the extent of particle leakage past the filter stage.

18 Claims, 5 Drawing Figures

METHOD OF AND APPARATUS FOR TESTING THE INTEGRITY OF FILTERS

The United States Government has rights in this invention pursuant to Contract No. DE-AC06-77RL01030 between the U.S. Department of Energy and Rockwell International.

BACKGROUND OF THE INVENTION

The present invention relates generally to air filtering or cleaning systems and, more particularly, to an apparatus for and method of testing the integrity of individual filters in a multistage filtering system embodying a plurality of filters.

In air cleaning and filtering systems, and particularly nuclear air cleaning facilities, it is important that all filters employed in such systems be absolutely leak-tight to preclude contamination of the effluent ultimately discharged into the atmosphere. Typically, these systems include two or more filter stages in series located in a common housing, each stage comprised of a bank or plurality of filters arranged horizontally and/or vertically in a common plane. In order to check the integrity (leak-tightness) of these filters to achieve and maintain the high performance levels required of an operative, high efficiency air cleaning system, the in-place testing of the system is necessary.

The usual in-place testing of a filtering system includes introducing a trace or test agent in the form of an aerosol upstream of the filtering system, the particles of which are dispersed uniformly over the upstream face area of the filter stage being tested. An upstream sampling device is positioned in close proximity to the upstream face of the filter to determine the trace agent concentration admitted to the filter. Any particles which penetrate the body of the filter or leak through the gasket or filter frames, etc., pass into the downstream region of the filter stage where it is thoroughly mixed with the filtered air. A sample of this filtered mixture is withdrawn to determine the trace agent concentration therein for comparison with the upstream trace agent concentration to calculate the extent of leakage, if any, of the filter stage. In order to assure adequate dispersion of the trace agent within the airstream to obtain a representative trace agent concentration in the above discribed procedure, the trace agent must be introduced into the airstream a distance equaling at least 10 duct diameters upstream of the filter stage being tested. Likewise, the representative sample of trace agent concentration penetrating the filter stage must be withdrawn a substantial distance downstream therefrom.

As heretofore mentioned, a nuclear air cleaning system usually contains two or more filter stages in series in the same container. This physical arrangement, which is dictated by space limitations and cost considerations and cannot accommodate the space requirements of the procedure described above, coupled with the laminar air flow between the stages poses special problems in an in-place testing procedure. Specifically, it is difficult to obtain uniform distribution of the trace agent within the airstream between two adjacent filter stages in order to obtain an adequate dispersion for a single point representative penetration sample taken downstream of the filter stage being tested.

Various attempts have been made to solve this problem, including the use of temporary bypass ducts, appropriate closure valves or covers, and mechanical or electrical devices to isolate the areas between adjacent filter stages for injecting the trace agent therein and/or discharging the filtered air and trace agent mixture therefrom for subsequent downstream sampling. Where filter stage leakage is detected, it is sometimes necessary for personnel to probe scan individual filters to identify the defective filter. Not only is this testing technique costly in providing the necessary hardware and labor but, more importantly, exposes personnel to radioactive or other toxic environments. Indeed, this procedure can not be employed at all in those hostile environments where radiation reaches such magnitudes that personnel access is prohibited.

Other efforts to overcome the above noted disadvantages are disclosed in U.S. Pat. No. 4,055,075 to Allan et al and U.S. Pat. No. 4,324,568 to Wilcox et al. for example. U.S. Pat. No. 4,055,075 discloses a method and apparatus for the leak testing of filters including means for imparting a like electrical charge to the trace agent particles so that the particles repel each other and thereby disperse within the airstream. A plurality of oppositely charged collecting plates are mounted adjacent the upstream face of each filter to accumulate particles and thereby determine the upstream particle concentration. Also, an oppositely charged collecting plate is mounted downstream of the filter to determine the extent of particle leakage past the filter. The disadvantages residing in this arrangement are the extra electrical equipment and components required as well as the deterioration and possible failure thereof requiring some maintenance and possible replacement. Also, any shorts in the system pose a safety hazard in certain volatile environments. Moreover, the positioning of the particle collecting plates would interfere with the otherwise uniform flow through the filters.

In another embodiment disclosed in the subject patent, a collapsible panel is employed to condense and impart turbulence to the airstream in order to disperse the particles therewithin. Such an arrangement involves actuating mechanisms and movable panels vulnerable to wear and resulting failure with consequent contact maintenance.

U.S. Pat. No. 4,324,568 discloses another approach for leak testing filters within restricted space requirements and utilizes a funnel-shaped member moveable into an operative position for condensing and mixing the airstream and particles and then dispersing the same over the frontal area of the adjacent filter. Again, this structural arrangement requires costly hardware and moveable parts vulnerable to wear and possible failure with resultant contact maintenance.

SUMMARY OF THE INVENTION

Accordingly, an object of the present invention is to obviate the above noted shortcomings by providing an improved method of and apparatus for the in-place testing of individual filters of a multistage air filtering system without any need for human contact maintenance.

Another object of this invention is to provide an absolutely maintenance-free, passive diffuser permanently installed between adjacent filter stages for dispersing a trace agent aerosol uniformly throughout an airstream in a confined space.

It is a further object of the present invention to utilize the foregoing diffuser apparatus as an ejector for introducing the trace agent particles into an airstream.

In one aspect thereof, the filter testing apparatus of this invention is characterized by the provision of a diffuser disposed in the laminar flow path of an air-particle mixture and comprising an elongated body defining a hollow pressure chamber and a pair of spaced, nested conical members connected to said body and defining a conical passage communicating with the pressure chamber and diverging outwardly away therefrom. A high velocity airstream is directed into the pressure chamber and is diffused outwardly through the conical passage for creating pressure differentials and thereby turbulence in the laminar flow path of the mixture to uniformly disperse the particles therewithin.

The foregoing and other objects, advantages and characterizing features of the present invention will become clearly apparent from the ensuing detailed description of an illustrated embodiment thereof, taken together with the accompanying drawings wherein like reference numerals denote like parts throughout the various views.

DESCRIPTION OF THE PREFERRED EMBODIMENT

Figure 1:
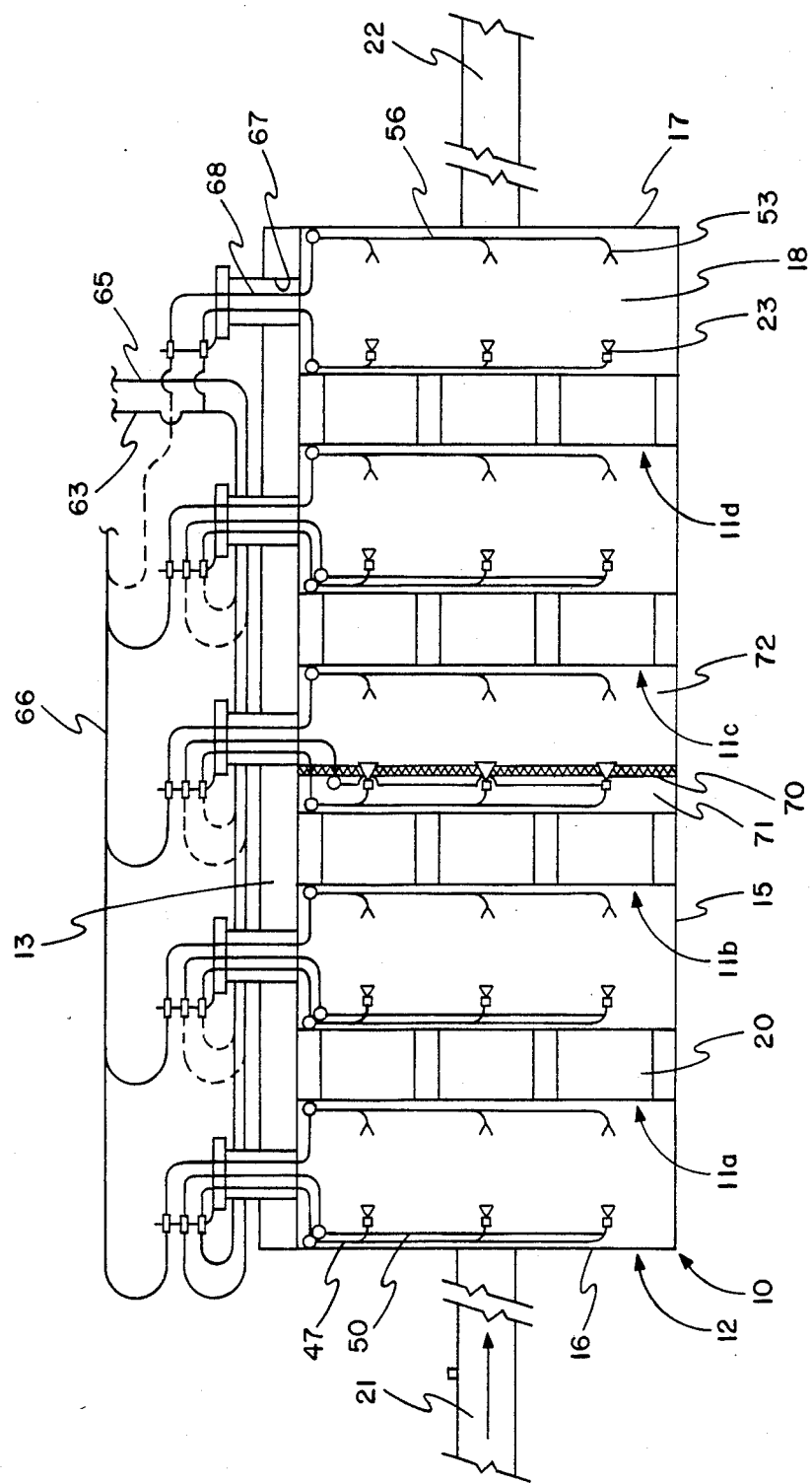
FIG. 1 is a diagramatic view of a multistage, high efficiency particulate air filtering system embodying the novel features of the present invention.

Referring now in detail to the drawings, there is shown diagramatically in FIG. 1 an illustrative embodiment of a nuclear air cleaning or filtering system, designated in its entirety by numeral 10 and embodying the novel features of this invention. The system 10 includes a plurality of axially spaced filter stages 11a, 11b, 11c, and 11d suitably fixedly and sealably mounted in a common housing 12 having a top wall 13, a bottom wall 15, a front end wall 16, a rear end wall 17, and opposite side walls 18, all rigidly secured together to form a box-like containment forming a part of an air duct system.

Each of the filter stages 11a–11d comprises a bank or plurality of identical high efficiency, particulate air filters 20 arranged vertically and horizontally in a common plane transversly across the interior of the housing 12. The filters 20 are suitably sealed to each other as well as the mounting frame to form a leak-tight assembly which, in turn, is adhesively or otherwise suitably sealed within the housing interior. These filters 20 are of a disposable, extended-pleated-medium dry type having a rigid casing enclosing the full depth of the pleats. The minimum particle removal efficiency of each filter 20 is 99.97% for thermal generated monodispersed aerosol particles with diameters of 0.3 microns. The maximum pressure drop across the filter is 1.0 inch W.G. when clean and operated at its rated overflow capacity.

Air, which may be exhausted from any enclosure or room intended to be maintained in a dust or contaminated-free condition, is directed through a supply inlet duct 21 into the housing 12 for axial laminar flow successively through the several filter stages 11a–11d to remove undesirable particles entrained therein. The filtered air exits through a suitable outlet duct 22 for ultimate discharge into the atmosphere.

It can be readily appreciated that the integrity or leaktightness of the system is important in precluding contamination of the exhausted air. Critical testing of such filter installations at a nuclear facility is required to verify the high level of performance and reliability required of the high efficiency nuclear air cleaning system. The standard that provides the guidelines for this type of testing is ANSI (American National Standards Institute) N510-1980, "Testing of Nuclear Air-Cleaning Systems". Basically, this procedure involves introducing a test or trace agent, preferably a polydispersed aerosol of dioclylphthalate (DOP) droplets or particles, sufficiently upstream of a single stage filtering installation to permit adequate dispersion of the DOP particles in the air to be filtered. A sample of the DOP concentration in this unfiltered air is taken upstream of the filter stage. Another sample of the DOP concentration is taken of the filtered air downstream of the filter stage and compared to the former sample to establish the extent of DOP penetration. A DOP penetration of up to 0.05% concentration is permissible, indicating a filter efficiency of at least 99.95%. If the system exceeds the specified maximum permissable value, the downstream face of the filter stage and mounting frame can be scanned with a photometer probe to locate high DOP concentrations which identify the defective filters.

The above described procedure performs admirably when testing a single stage filtering system in a single container. Likewise, it is suitable for determining the overall integrity of a multistage filtering system. It can also be employed to perform an in-place test of individual filter stages in a multistage filtering system where contamination is not a serious problem and contact maintenance can be tolerated along with the utilization of appropriate bypass ducts, closure valves and the like to isolate the areas between adjacent filter stages as noted earlier. Where contamination does preclue human access, the above procedure can only test the overall integrity of the system, which is not a reliable test in identifying individual defective filter stages.

The present invention addresses this problem and provides a solution therefor by providing passive means for safely and reliably testing the integrity of individual filter stages of a multistage, high efficiency particulate air filtering system that is subjected to a hostile environment where human occupancy is either prohibited or, because of physical limitations, is difficult to achieve. To this end, such means includes a diffuser apparatus, generally designated 23, for creating turbulence in the laminar flow between successive filter stages to insure good mixing of the air and trace agent particles both upstream and downstream of the filter stage being tested. Such uniform distribution of the trace agent within the airstream is necessary to provide uniform particle dispersion over the entire upstream face area of the filter stage and to obtain a true representative sample at a single point downstream therefrom. In addition to its diffusing function, apparatus 23 also can serve as an ejector for introducing the trace agent particles into the airstream upstream of the filter stage being tested.

Figure 2:
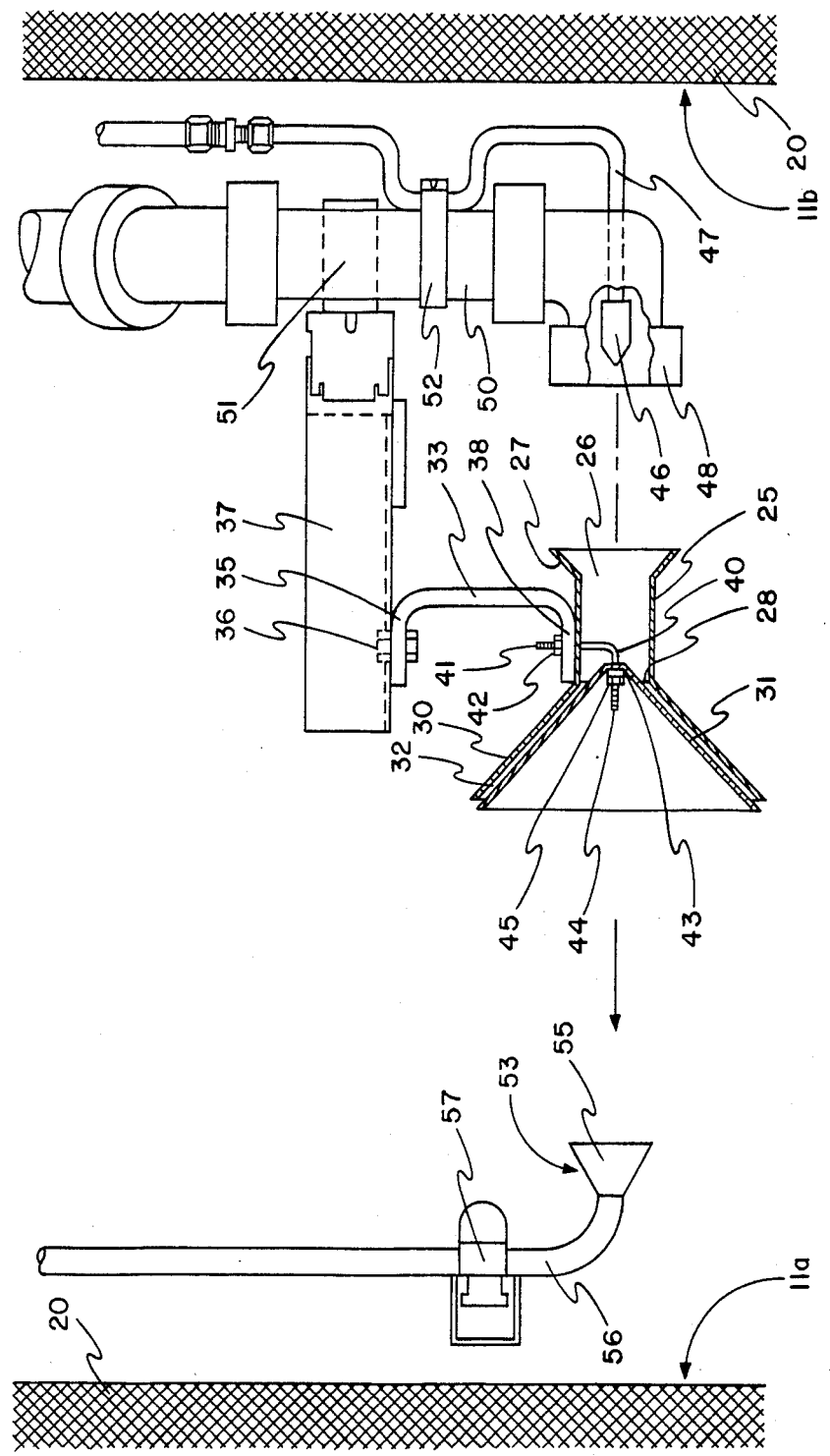
FIG. 2 is a longitudinal sectional view, of a diffuser apparatus constructed in accordance with this invention and shown in its permanently installed position between a pair of spaced filter stages.

As best shown in FIG. 2, diffuser 23 comprises an elongated hollow body 25 defining a high pressure chamber 26 having a conically shaped inlet end 27 and an outlet end 28. A first or outer conically shaped member 30 is attached at its smaller, inner end to the outlet end 28 of diffuser body 25. A second or inner conically shaped member 31 having a closed inner end is mounted by means hereinafter described in a spaced, nested relation within the outer member 30. The space between the outer wall surface of member 31 and the inner wall surface of member 30 defines a conical passage 32 communicating with the outlet of pressure chamber 26.

The means for mounting diffuser 23 within housing 12 includes a U-shaped bracket 33 having one leg 35 thereof ridgidly secured, as by a fastener 36, to a structural member 37 forming a part of the housing frame. The other leg 38 of bracket 33 is affixed to body 25 by an L-shaped member 40 having a threaded leg 41 projecting upwardly through the wall of body 25 and bracket leg 38 and secured in place by a suitable nut 42. The closed flat end of inner conical member 31 is provided with a nut 43 affixed thereto for threading member 31 onto the other leg 44 of member 40 and securing member 31 in place by a lock nut 45. The spacing between conical members 30 and 31 and thereby the size of passage 32 can be adjusted as desired or required by threading the inner conical member 31 axially toward or away from the outer member 30 in the appropriate direction.

The diffuser body 25 is mounted in coaxial alignment with but spaced from an air nozzle 46 attached to the distal end of a high pressure conduit 47 connected at its other end to a suitable high pressure air source (not shown). The diffuser body 25 also is coaxially aligned with the outlet end 48 of a conduit 50 connected to an aerosol trace agent source (not shown). Conduit 50 is supported in part by structural member 37 by means of a clamp 51 while the air conduit 47 is attached to conduit 50 by a suitable clamp 52. As shown in FIG. 2, the conduit 47 projects through a suitable opening in conduit 50 to position the nozzle 46 within the interior of the greater i.d. outlet 48 and in coaxial registry therewith.

FIG. 2 also illustrates a sample port 53 adapted to be used in conjunction with this invention. The sample port 53 comprises a conically shaped funnel inlet 55 connected at its inner end to a sampling conduit 56 supported in the housing 12 as by suitable mounting means 57. The sample port 53 is located adjacent the opposite filter 20 in spaced relation to the diffuser apparatus 23.

Figure 3:
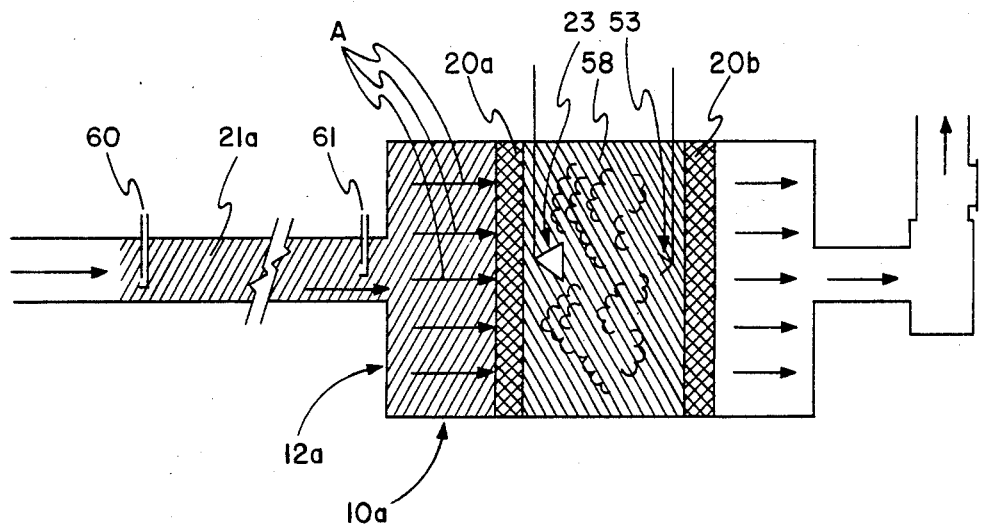
FIG. 3 is a schematic view of a two-stage filtering system, showing the diffuser of this invention permanently mounted therebetween and employed only for dispersing trace agent particles within an airstream.

FIG. 3 illustrates an exemplary two stage filter air cleaning system 10a having axially spaced filters 20a and 20b mounted in a single housing 12a and utilizing the apparatus 23 of this invention as a diffuser only. It should be understood that the filters 20a and 20b which define a chamber 58 therebetween can be representative of filter stages or banks composed of a plurality of individual filters 20 as desired. The DOP trace agent is introduced into supply duct 21a through a port 60 sufficiently upstream of filter 20a to insure adequate dispersion of the trace agent particles within the airstream. A sample port 61 can be tapped into duct 21a for conveniently withdrawing a test sample of the DOP concentration. The air-DOP mixture advances in a laminar flow path in the direction of the arrows A successively through filters 20a and 20b.

The diffuser 23 of this invention is operative to create sufficient turbulence in chamber 58 between filters 20a and 20b to insure optimum mixing of the filtered air and the remaining DOP particles that have penetrated filter 20a to form a homogeneous mixture and thereby provide an accurate representative sample taken at sampling port 53. This penetration sample is compared to the 100% concentration taken upstream of the first filter 20a to ascertain the integrity of filter 20a. Any penetration value less than 0.05% which indicates a filter efficiency of at least 99.95% tests satisfactorily under ANSI requirements.

Figure 5:
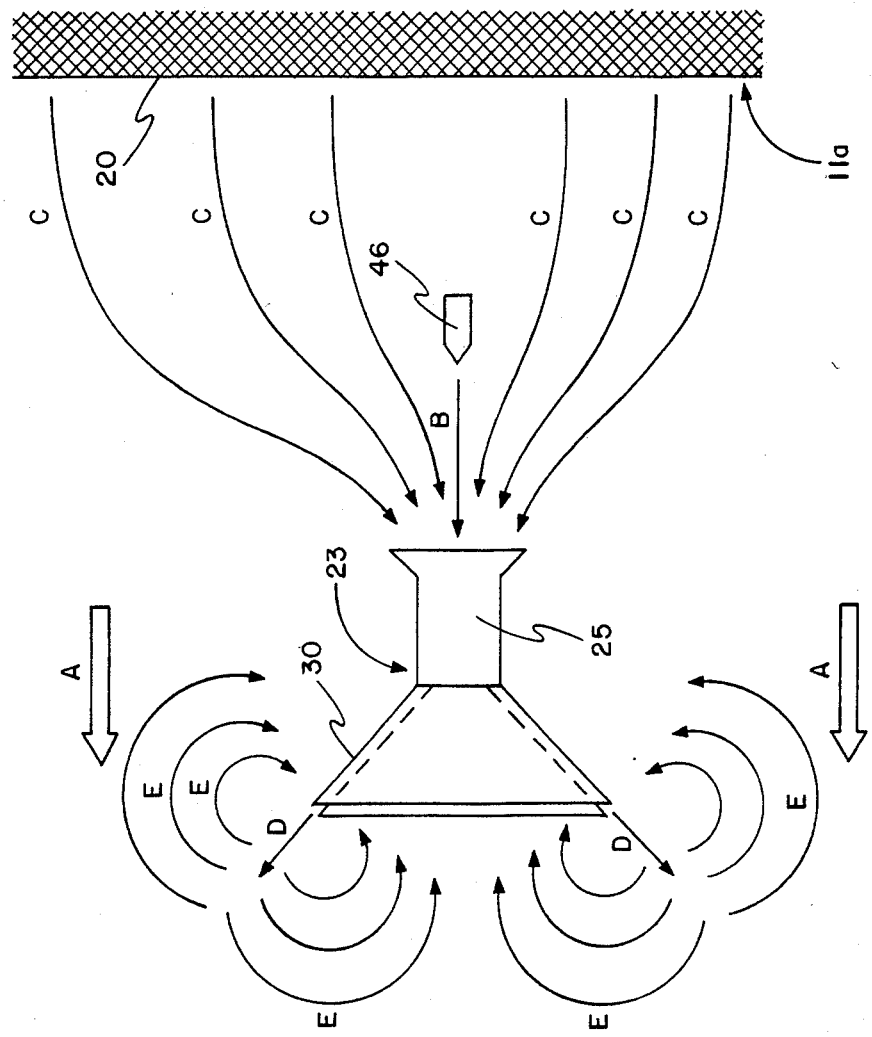
FIG. 5 is a diagramatic view, illustrating the various flow paths generated by the diffuser of this invention to create the necessary turbulence for uniform particle distribution.
Figure 5:
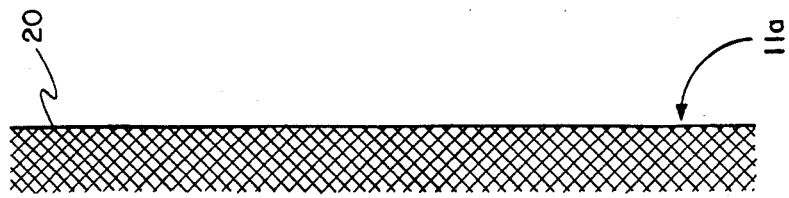

Referring now to FIGS. 2 and 5, the mode of operation of apparatus 23 is as follows:

Air under high pressure, on the order of 100 psi for example, is directed via conduit 47 and nozzle 46 at a high velocity into the high pressure chamber 26 of diffuser body 25. This high velocity flow, designated B in FIG. 5, creates a low pressure zone whereby part of the laminar flow is drawn in the direction of arrows C into the high pressure chamber 26. This pressure is released by flow through the diverging conical passage 32 at a high velocity in the direction of arrows D, again creating a low pressure area to form eddies E and thereby further disturb the remaining laminar flow. The combined turbulence effected by high velocity flow into the pressure chamber 26 and then divergently outwardly through passage 32 creates an agitated homogeneous DOP-air mixture, as shown in FIG. 3, moving generally in the direction of arrows A. Thus, operation of the diffuser 23 generates the necessary turbulence to thoroughly diffuse the DOP particles within the filtered air stream between filters 20a and 20b to obtain an accurate single point penetration sample at port 53.

Figure 4:
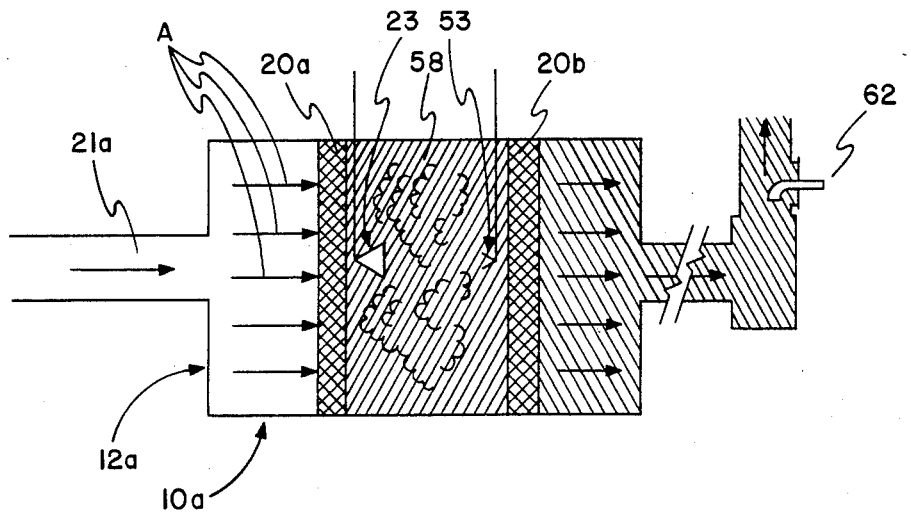
FIG. 4 is a view similar to FIG. 3, wherein the diffuser also is employed to introduce trace agent particles into an airstream.

FIG. 4 illustrates the use of apparatus 23 as a particle ejector as well as a diffuser in testing the integrity of the second filter 20b. In this arrangement, the DOP must be introduced behind filter 20a and upstream of the filter 20b to accurately determine the integrity of the latter. Referring to FIG. 2, the DOP trace agent is supplied through conduit 50 and outlet 48 concurrently with the high pressure air through nozzle 46 and enters into the pressure chamber 26. The trace agent is compressed in the pressure chamber 26, dispersed through the conical passage 32 and finally ejected into the turbulent airflow, again creating a homogeneous mixture as shown in FIG. 4. This turbulence disperses the DOP particles uniformly over the face area of filter 20b and insures that the sample taken at port 53 is a true representation of the DOP concentration at that point. The filtered air and DOP penetration exiting filter 20b can then be sampled, as through port 62, sufficiently downstream of the filter 20b so that a thoroughly mixed penetration sample can be withdrawn. Alternatively, another diffusing apparutus 23 can be positioned just beyond filter 20b to agitate the filtered air-DOP mixture for a representative penetration sampling at a location nearer the downstream face of filter 20b. Accordingly, the integrity of each individual filter stage of any multistage filtering system can be effectively tested in place.

In the multistage, nuclear air cleaning system 10 shown diagrammatically in the illustrative embodiment of FIG. 1, a plurality of diffusers 23, as well as sample ports 53, are utilized. While a diffuser 23 and sample port 53 are associated with each filter 20 in this embodiment, it should be appreciated that the number of these devices relative to the number of filters can vary widely, as dictated by design considerations. The air pressure in conduit 47 is supplied by a manifold 63 connected to a suitable high pressure air source (not shown). The trace agent, preferably DOP in the form of an aerosol, is supplied to the several conduits 50 by means of a supply manifold 65 connected at its other end to an aerosol generator (not shown). The several sampling conduits 56 are connected to a manifold 66, in turn, connected to a suitable particle detection device, such as a light photometer for example (not shown). Since the high pressure air source, aerosol generator and light photometer are conventional and, per se, form no part of this invention, no further amplification or description thereof is believed necessary.

Housing 10 can be partially or completely disposed underground, the top wall 13 thereof being in the form of a thick cover having suitable openings 67 therein for receiving plugs 68 provided with openings or ducts for accommodating the air pressure supply lines 47, the DOP supply lines 50 and the sampling conduits 56.

A biological shield 70 can be provided in housing 12 to separate the latter into two compartments 71 and 72, thereby allowing human entry into compartment 72 while filtering stages 11a and 11b in compartment 71 are performing their function. This is desirable since the shelf life of conventional high efficiency particulate air filters is limited to approximately seven years. Accordingly, only the filters comprising stages 11a and 11b can be initially installed for start-up. Thereafter, upon either complete saturation or substantial deterioration of these initially installed filters, or early detection of leakage therepast into compartment 72 before human access is prohibited, personnel can enter compartment 72 to install the remaining filters comprising stages 11c and 11d and thereby extend the useful life of the system 10. From the foregoing, it is apparent that the objects of the present invention have been fully accomplished. As a result of this invention, a new and useful apparatus and method is provided for testing the integrity of individual filters or filter stages of a multistage filtering system. The apparatus comprises a diffuser/ejector device for creating turbulence in a laminar air flow stream to thoroughly mix an aerosol trace agent therewith for uniform dispersion over the face area of the filter stage being tested and to agitate the filtered-trace agent concentration downstream of such stage so that a representative sample of trace agent penetration can be obtained at a single sample point. Additionally, the device can also be utilized to simultaneously eject or introduce the aerosol trace agent into a laminar flow air stream while diffusing the same to acheive the desired homogeneous mixture. This passive diffuser has no serviceable or moving parts and can be installed permanently in the air cleaning system's air flow with negligible resistance to the system's flow when inoperative. The diffuser of this invention requires no contact maintenance during its useful life, which is anticipated to exceed the expected life of the filtering system. Accordingly, it is especially suited for installations where human access is either physically impossible or prohibited due to a hostile environment, such as in a nuclear air cleaning facility for example.

While the apparatus and method of this invention has been described in connection with a nuclear air cleaning system and admirably complies with the requirements prescribed by the ANSI standards for nuclear applications, it should be understood that the invention is not restricted thereto, but has utility in any air filtering operation, and especially those filtering operations carried out in a hostile or toxic environment.

It is to be understood that the form of the invention herein shown and described is to be taken as an illustrative embodiment only of the same, and that various changes in the shape, size and arrangement of parts, as well as various procedural changes, may be resorted to without departing from the spirit of the invention.

I claim:

1. A method of testing the integrity of a filter mounted in a housing in sealing engagement therewith comprising: passing an airstream in a laminar flow path through said housing and filter, introducing trace agent particles into said airstream upstream of said filter, introducing from a separate source a restricted high velocity airstream in an axial direction within said first mentioned airstream and along said laminar flow path, diffusing said high velocity airstream outwardly in a diverging path into said laminar flow path to create pressure differentials for agitating and uniformly dispersing said particles within said first mentioned airstream to form a homogeneous air-particle mixture passing through said filter, and sampling the filtered airstream downstream of said filter to determine the extent of particle concentration therein.

2. The method according to claim 1, including agitating said filtered airstream downstream of said filter to uniformly disperse any particles exiting said filter throughout said filtered airstream before sampling the latter.

3. The method of claim 2, wherein the step of agitating said filtered airstream includes introducing a high velocity airstream from said separate source in an axial direction downstream of said filter and diffusing said high velocity airstream outwardly in a diverging path to create pressure differentials and consequent turbulence.

4. The method according to claim 2, wherein the sampling of said filtered and agitated airstream is taken at a single point downstream of said filter.

5. The method of claim 1, including sampling said homogenous airstream mixture immediately ahead of said filter, and comparing the particle concentration of said filtered airstream downstream of said filter to the particle concentration of said mixture upstream of said filter to determine the extent of particle leakage past the filter.

6. The method of claim 1, wherein said trace agent particles are directed axially long said high velocity airstream and carried thereby outwardly along said diverging path for uniform dispersion within said first mentioned airstream.

7. An apparatus for testing the integrity of a filter in an air cleaning system comprising: a housing having an airstream passing in a laminar flow path therethrough, a filter mounted in said housing in a fluid tight relation therewith, means for introducing trace agent particles into said airstream upstream of said filter, means for introducing a restricted high velocity airstream in an axial direction within said first mentioned airstream and along said laminar flow path, passive means for diffusing said high velocity airstream outwardly in a diverging path into said laminar flow path to create pressure differentials for agitating and uniformly dispersing said particles within said first mentioned airstream to form a homogeneous air-particle mixture passing through said filter, and means for withdrawing a sample of said filtered airstream downstream of said filter to determine the particle concentration passing through said filter.

8. An apparatus according to claim 7, including means downstream of said filter for agitating said filtered airstream to uniformly disperse any particles exiting said filter throughout said filtered airstream before sampling the latter.

9. An apparatus according to claim 8 wherein said agitating means includes means for introducing a high velocity airstream in an axial direction within said filtered airstream downstream of said filter and passive means diffusing said high velocity airstream outwardly in a divergent path to create turbulence.

10. An apparatus according to claim 7, wherein said diffusing means comprises a hollow body defining a pressure chamber and a pair of spaced, nested conically shaped members connected to said body and defining a conical passage therebetween commmunicating with said pressure chamber and extending outwardly therefrom.

11. An apparatus for diffusing a high velocity air stream into the laminar flow path of a gaseous stream comprising: a housing located in the laminar flow path of a gaseous stream, said housing provided with a pressure chamber having an inlet at one end thereof and an outlet at the opposite end thereof, a first conically shaped member having an open inner end affixed to said housing outlet end and flaring outwardly therefrom, a second conically shaped member having a closed inner end, means mounting said second conically shaped member in a spaced, nested relation within said first conically shaped member to define a conical passage therebetween communicating with said pressure chamber outlet, and means for directing a high velocity airstream into said pressure chamber through said inlet, said airstream being diverted outwardly through said conical passage to create pressure differentials and turbulence in the laminar flow path of said gaseous stream.

12. An apparatus according to claim 11, including means for adjusting the spacing between said first and second conically shaped members to vary the size of said conical passage.

13. An apparatus according to claim 11, including means for mounting said second conically shaped member within said first conically shaped member in closely spaced relation thereto.

14. An apparatus according to claim 13, wherein said mounting means includes means for selectively adjusting the spacing between the first and second conically shaped members and thereby varying the size of said conical passage.

15. An apparatus according to claim 11, including means for introducing particles into said gaseous stream for uniform dispersion therewithin by virtue of the turbulence created in said gaseous stream.

16. An apparatus according to claim 15, wherein said particles are directed into said pressure chamber along with said high velocity airstream and dispersed therewith through said conical passage into the gaseous stream.

17. The method of claim 6, including compressing said trace agent particles before directing said particles along with said high velocity airstream outwardly along said diverging path.

18. An apparatus according to claim 16, wherein said particles are compressed in said pressure chamber before dispersement through said conical passage.

* * * * *